US008838928B2

(12) United States Patent
Robin et al.

(10) Patent No.: US 8,838,928 B2
(45) Date of Patent: Sep. 16, 2014

(54) MEMORY MANAGEMENT AND METHOD FOR ALLOCATION USING FREE-LIST

(75) Inventors: Jean-Luc Robin, Saint Jean (FR); Jose Mendes-Carvalho, Venerque (FR)

(73) Assignee: Freescale Semiconductor, Inc., Austin, TX (US)

( * ) Notice: Subject to any disclaimer, the term of this patent is extended or adjusted under 35 U.S.C. 154(b) by 981 days.

(21) Appl. No.: 12/865,138

(22) PCT Filed: Feb. 8, 2008

(86) PCT No.: PCT/IB2008/051774
§ 371 (c)(1),
(2), (4) Date: Jul. 29, 2010

(87) PCT Pub. No.: WO2009/098547
PCT Pub. Date: Aug. 13, 2009

(65) Prior Publication Data
US 2010/0312984 A1   Dec. 9, 2010

(51) Int. Cl.
*G06F 12/02* (2006.01)
*G06F 12/06* (2006.01)

(52) U.S. Cl.
CPC .......... *G06F 12/023* (2013.01); *G06F 12/0615* (2013.01)
USPC .................... 711/170; 711/147; 711/E12.002

(58) Field of Classification Search
CPC  G06F 12/023; G06F 12/0269; G06F 12/0615
USPC .................... 711/170, 202, 203, E12.002, 147
See application file for complete search history.

(56) References Cited

U.S. PATENT DOCUMENTS 5,109,336 A * 4/1992 Guenther et al. ............. 711/171
5,784,699 A * 7/1998 McMahon et al. ............ 711/171
(Continued)

FOREIGN PATENT DOCUMENTS

EP   0788053 A   8/1997

OTHER PUBLICATIONS

"Method for Dynamically Managing Virtual Storage Pools", IBM Technical Disclosure Bulletin, IBM Corp, New York, US, vol. 36, No. 3, Mar. 1, 1993, pp. 147-148.

(Continued)

*Primary Examiner* — Pierre-Michel Bataille

(57) ABSTRACT

A method of managing a memory of an apparatus, the apparatus executing one or more processes using the memory. The method comprises maintaining a plurality of lists of identifiers, wherein each list has an associated size value and an associated threshold corresponding to a maximum number of identifiers in that list, wherein each identifier identifies a corresponding region of the memory that had been allocated for a process but that is currently not required by any of the one or more processes, and wherein the size of a region of the memory identified by an identifier of a list equals the size value associated with that list. When a process requests allocation of a region of the memory: one of the lists are identified that has an associated size value suitable for the allocation request; and if that list is not empty, to that process a region is identified of the memory identified by one of the identifiers stored in that list and that identifier is removed from that list, and, otherwise, a region of the memory is allocated with a size of the identified associated size value and the allocated region is identified of the memory to that process. The method comprises adjusting one or more of the thresholds in dependence upon the current usage of the memory by the one or more processes.

20 Claims, 4 Drawing Sheets

(56) References Cited

U.S. PATENT DOCUMENTS

| | | |
|---|---|---|
| 6,539,464 B1 | 3/2003 | Getov |
| 7,003,597 B2 | 2/2006 | Georgiou |
| 7,055,015 B2 * | 5/2006 | Shiota ............................ 711/203 |
| 7,570,653 B2 * | 8/2009 | Sinha et al. .................... 370/415 |
| 7,788,455 B2 * | 8/2010 | Dunshea et al. ............... 711/170 |
| 2003/0084266 A1 | 5/2003 | Knippel et al. |
| 2007/0255771 A1 * | 11/2007 | Inoue et al. .................... 707/205 |
| 2008/0184000 A1 * | 7/2008 | Kawaguchi ..................... 711/171 |
| 2011/0246742 A1 * | 10/2011 | Kogen et al. ................... 711/170 |

OTHER PUBLICATIONS

International Search Report and Written Opinion correlating to PCT/IB2008/051774 dated Oct. 24, 2008.

\* cited by examiner

MEMORY MANAGEMENT AND METHOD FOR ALLOCATION USING FREE-LIST

FIELD OF THE INVENTION

The present invention relates to a method of managing a memory of an apparatus, and an apparatus and a computer program arranged to carry out such a method

BACKGROUND OF THE INVENTION

Various methods of memory allocation and deallocation for computer systems are known. FIG. 1 of the accompanying drawings schematically illustrates a computer system 100. The computer system 100 comprises a processor 102 and a memory, such as a random access memory (RAM) 104. The computer system 100 may be, for example, a personal computer, a portable device (such as a mobile telephone or a personal digital assistant), an embedded system, a network of several computers, or any computing platform, etc. It will be appreciated that the computer system 100 may comprise more than one processor 102, with these processors either operating independently of each other or working together. It will also be appreciated that the computer system 100 may comprise one or more RAMs 104. Processors 102 and RAMs 104 are well-known, as are methods of providing them in an apparatus (computer system 100), and shall therefore not be described in more detail herein.

The processor 102 executes one or more applications, processes, threads or tasks in order to carry out the functionality required of the computer system 100. Execution of an application may involve executing one or more associated processes, threads or tasks. Throughout this specification, the terms "application", "process", "thread" and "task" will be used as synonyms, and the skilled person will recognise that this specification applies equally to memory allocation and deallocation for applications, processes, threads or tasks.

To execute a process, the processor 102 will receive, store, modify, operate on and output various data. Some of this data may be used merely as intermediate data during processing of the process; other data may be input data received from a source (such as a human user) external to the process; other data may be output data that is an end-product of the process. The processor 102 stores data in the memory 104 and can access and modify the data stored in the memory 104. As such, one or more respective regions of the memory 104 are allocated (or assigned) to each of the processes being executing.

Allocation of memory for a process may be performed by so-called "static memory allocation", or "dynamic memory allocation", or both. These are described in more detail below.

Static memory allocation involves a fixed amount of memory being reserved for (or allocated to) a process at compile-time, i.e. when the program code (or software) for that process is initially written and then compiled to form executable software. For example, the memory for constant data, such as string literals, and global variables is usually statically allocated. At the beginning of execution of the process, a region of the memory 104 that is large enough for that process's static memory allocations is allocated to that process. This memory region is maintained throughout the run-time of the process for use by that process, and is only released (or freed) once that process has been terminated. Once this memory region has been freed, some or all of that memory region may be allocated to another process.

Additionally, at the beginning of execution of a process, another fixed size region of the memory 104, called the "stack", may be allocated to that process. The stack is used for a variety of purposes, such as for storing local variables (i.e. variables used solely within a given block of program code) and for storing the instruction address to which processing should return on completion of an active subroutine of that process.

Dynamic memory allocation involves a process requesting, at run-time, the allocation of a contiguous region (i.e. a contiguous block or area or buffer) of currently unused (i.e. free, unallocated or available) memory from the memory 104. Dynamic memory allocation is usually performed from a section of the memory 104, called the "heap", that is reserved just for dynamic memory allocation. Dynamic memory allocation is often performed, for example, when the size of memory required for a particular purpose is not known at compile-time, with this size only becoming known during run-time. For example, the amount of memory required to store an image will depend on the dimensions of that image, and these dimensions may only be known from the input from a user (i.e. during run-time rather than during compile-time). Whilst the programmer could elect to statically allocate enough memory (for example, based on a worst-case-estimate predicting the largest amount of memory that could possibly be required), this would be inefficient memory usage as it leaves less of the memory 104 available for use by other processes.

There are various methods well known in this field of technology by which the processor 102, and the operating system being used by the computer system 100, may manage the memory on the heap so that the processor 102 can distinguish between regions of the memory 104 that have been allocated and regions of the memory 104 that are free. This allows the processor 102 to find a free region of the memory 104 when a dynamic memory allocation request is received. For example, each contiguous region of allocated memory and each contiguous region of free memory may be provided with a header and a footer that store an indicator of whether that region is allocated or is free, together with an indication of the size of that region. Adjacent regions of free memory may be merged together to form a single larger region of free memory with a single header and footer. Thus, the processor 102 can traverse between regions of the memory using the size values indicated in the headers and footers. A dynamic memory allocation request for a specific amount of memory will involve finding a region of the memory 104 that is marked as being free and that is sufficiently large to provide at least the requested amount of memory for the requesting process (together with any headers and footers that need to be maintained). The headers and footers for the regions are then updated accordingly, so that the memory region that is now allocated for the requesting process is identified as having been allocated. It will be appreciated, though, that other mechanisms may be used to allow the processor 102 to distinguish between regions of the memory 104 that have been allocated and regions of the memory 104 that are free.

In the C programming language, a dynamic memory allocation request can be achieved by calling (or executing or performing or running) the C-library function void* malloc (size_t size). This function has an input parameter, size, representing the amount of memory that the process wishes to have allocated, and returns a pointer to (or identifier of) the allocated memory region. Execution of the malloc function at run-time causes the processor 102 to try to find a contiguous region of the memory 104 of the requested size that is currently free. If a region of the memory 104 of the requested size is found, then that region of the memory 104 is allocated and the allocated region of the memory 104 is identified to the process that made the allocation request, for example by the malloc function returning a pointer to (i.e. an indicator of a memory address for) that region of the memory 104. If a region of the memory 104 of the requested size could not be found (for example, if there is not sufficient unused memory to provide a contiguous block of memory of the requested size), then this failure may be indicated to the process, for example by the malloc function returning a NULL pointer.

It will be appreciated that other programming languages may use other functions accordingly (such as the function new in C++).

If memory that has been dynamically allocated is not subsequently deallocated (i.e. freed, or released, for use by another process, or for use by the same process at a later point in time), then a so-called "memory leak" occurs. In this situation, the amount of unallocated memory in the memory 104 may continue to decrease, possibly reaching the stage at which there is no more memory free in the memory 104 for allocation to a process.

Thus, associated with dynamic memory allocation is dynamic memory deallocation. When a process no longer requires a region of the memory 104 that had been dynamically allocated for it, then the process may (and should) deallocate that memory region. For example, in the C programming language, a dynamic memory deallocation may be achieved using the C-library function void free (void* pointer), which has as an input parameter a pointer to the memory region to be deallocated (such as the pointer that was initially returned by the call to the function malloc that initially allocated that region of the memory 104). The processor 102 then records that this memory region is no longer allocated to a process, i.e. it is now free and may be allocated again. As discussed above, this may be achieved in numerous ways by the processor 102 and the operating system being run by the computer system 100.

The processor 102 may spend a large amount of processing time processing a dynamic memory allocation request as it tries to find a region in the memory 104 of the requested size. For example, when the computer system 100 is initialised and begins to execute a first process, the usage of the memory 104 is quite low and so it will be relatively easy to identify a suitable memory region in response to a dynamic memory allocation request. However, once the computer system 100 has been running for some time, and is executing a large number of processes, the usage of the memory 104 may be quite high and so it will be relatively harder to identify a suitable memory region in response to a dynamic memory allocation request. This is compounded by the fact that the memory 104 will become fragmented over time, i.e. portions of allocated memory will be interleaved with portions of free memory, which may therefore make it harder to find a contiguous memory region of a requested size, even though the combined amount of free memory (when considered as non-fragmented memory) may still be more than sufficient for the requested allocation size. This problem is particularly relevant to systems which inherently have a relatively small memory 104 (such as a mobile telephone).

One known approach to tackling this problem is for the processor 102 and the operating system to store and use so-called "free-lists" to handle dynamic memory allocation and deallocation. The use of free-lists is described with reference to FIGS. 2 and 4 of the accompanying drawings, in which FIG. 2 is a flow-diagram schematically illustrating known processing for dynamic memory allocation using free-lists, whilst FIG. 4 is a flow-diagram schematically illustrating known processing for dynamic memory deallocation using free-lists.

Before describing the use of free-lists in detail, a brief overview is appropriate. A free-list is a list (or pool or store) of identifiers, where each identifier identifies a corresponding region of the memory 104 that had been allocated for a process (for example, in response to that process calling the malloc function) but that is currently not required by any of the one or more processes (for example, the process to which the memory region had been allocated has indicated that it no longer needs that memory region by calling the free function). The identifier may be, for example, a memory pointer, i.e. an address within the memory 104.

A free-list has an associated predetermined size value S. For a free-list having an associated size value S, the size of each of the regions of the memory 104 identified by identifiers stored in a free-list is that associated size value S (excluding any headers or footers of the memory regions that may be used for the memory management).

Additionally, a free-list with associated size value S has an associated predetermined threshold $\tau(S)$. The threshold $\tau(S)$ is the maximum number of identifiers that can be stored in that free-list. The actual number of identifiers currently stored in the free-list that has an associated size value S is represented as the value $N(S)$. Hence, $N(S)$ lies in the range $0 \leq N(S) \leq \tau(S)$. Naturally, in these known systems, the threshold value $\tau(S)$ is greater than 0, as otherwise the free-list would not be able to store any identifiers.

Thus, a free-list with associated size value S identifies up to $\tau(S)$ regions of the memory 104 of size S, where each of these regions (i) was initially dynamically allocated for a corresponding process and (ii) is no longer required by any process, i.e. these memory regions are available for use. However, a memory region identified by an identifier in a free-list has not actually been deallocated by the processor 102 and the underlying operating system, so that, save for the use of the free-lists (as discussed below) the processor 102 would still consider this memory region to not be available for allocation to a process.

A free-list may be implemented as a first-in-first-out buffer or a last-in-last-out buffer, or any other suitable list structure as is well known in this field of technology.

A predetermined plurality of free-lists are used and maintained, each with different associated size values S. For example, eight free-lists may be maintained to handle dynamic memory allocation and deallocation, with associated size values of 100 bytes, 500 bytes, 1000 bytes, 1500 bytes, 2000 bytes, 5000 bytes, 10000 bytes and 65535 bytes. The corresponding thresholds may be, for example, $\tau(100)=3$, $\tau(500)=1$, $\tau(1000)=4$, $\tau(1500)=2$, $\tau(2000)=1$, $\tau(5000)=2$, $\tau(10000)=1$, $\tau(65535)=4$. Known systems may make use of an alternative predetermined number of free-lists, and these free-lists may have different predetermined associated size values and thresholds.

FIG. 2 is a flow-diagram schematically illustrating known processing 200 for dynamic memory allocation using free-lists.

At a step S202, a dynamic memory allocation request is called by a process, requesting allocation of a region of the memory 104 of a specified size S_req.

At a step S204, the free-list to use for this dynamic memory allocation request is identified. This is achieved by identifying the smallest size value S associated with the free-lists that is at least as large as the size S_req, i.e. the size value S is a size value suitable for the requested memory allocation. For example, with the above configuration of size values and thresholds: (i) if S_req=130 bytes, then the identified size value is S=500; (ii) if S_req=3400 bytes, then the identified size value is S=5000; and (iii) if S_req=1500 bytes, then the identified size value is S=1500. In this way, the smallest size of the memory regions accommodated by the free-lists that is sufficiently large for the requested memory allocation is determined.

At a step S206, it is determined whether the identified free-list with associated size value S is empty, i.e. whether it is currently storing any identifiers. If N(S)>0 (i.e. that free-list is not empty as there is at least one identifier stored in this free-list), then processing continues at a step S208; otherwise, if N(S)=0 (i.e. that free-list is empty as there are no identifiers stored in this free-list), then processing continues at a step S212.

At the step S208 (i.e. when the identified free-list is not empty), one of the identifiers in the identified free-list is chosen. The memory region identified by that identifier is then identified (indicated) to the requesting process, for example by returning a pointer to that memory region in response to the call to the malloc function. In this way, the process has been assigned (provided with) a suitably-sized memory region without the processor 102 having to actually search the memory 104 for a suitably-sized memory region to allocate to the process.

Then, at a step S210, the chosen identifier is removed from the identified free-list and the value of N(S) is decremented by one to update the number of identifiers in that free-list accordingly.

Alternatively, at the step S212 (i.e. when the identified free-list is empty), the processor 102, using the underlying operating system functionality, actually performs an allocation of a memory region of the identified size S. Methods for doing this are discussed above, i.e. a search for a contiguous region of free memory having the identified size S is performed and the memory region that is found is marked as being allocated.

When a region of the memory 104 having the identified size S has been found, then at a step S214 that memory region is identified (indicated) to the process requesting the dynamic memory allocation, for example by returning a pointer to that memory region in response to the call to the malloc function.

If the search at the step S212 had failed to find a contiguous memory region of the identified size S that is free, then this failure would be indicated to the process requesting the dynamic memory allocation, for example, by returning a NULL pointer in response to the call to the malloc function and the process would perform exception handling as appropriate.

FIG. 4 is a flow-diagram schematically illustrating known processing 400 for dynamic memory deallocation using free-lists.

At a step S402, a dynamic memory deallocation request is called by a process, requesting deallocation of a particular region of the memory 104.

At a step S404, the size S of that region of the memory 104 is identified. For example, if the above-described memory management scheme using headers and footers is used, then the size of that memory region can be determined by reading that memory region's header or footer. However, other methods for recording and identifying the size of an allocated region of memory are known when other memory management schemes are used.

The identified size S will correspond to the size value associated with one of the free-lists, as this memory region would have been dynamically allocated using the method 200 described above with reference to FIG. 2 and which always allocates a memory region with a size equal to the size value associated with one of the free-lists. In this way, the free-list to use for this dynamic memory deallocation request is identified.

At a step S406, it is determined whether the identified free-list with associated size value S is full, i.e. whether N(S)=τ(S).

If the identified free-list is full (i.e. the number of identifiers stored in the identified free-list equals the threshold associated with that free-list, N(S)=τ(S)), then processing continues at a step S408 at which that memory region is deallocated. This is achieved by the processor 102 and the underlying operating system, which mark this memory region as now being free for re-allocation.

However, if the number of identifiers stored in the identified free-list is less than the threshold associated with that free-list (i.e. N(S)<τ(S)), so that the free-list is not full, then processing continues at a step S410. At the step 410, instead of deallocating the memory region and marking it free for re-allocation, an identifier of that memory region is added to that free-list. Then at a step S412, the value of N(S) is incremented by one to update the number of identifiers in the free-list accordingly.

Thus, the use of free-lists may avoid the usually large amount of processing that is required to search for a memory region in response to a dynamic memory allocation request. Additionally, the processing required in response to a dynamic memory deallocation request is reduced. Furthermore, the use of free-lists helps reduce external fragmentation of the memory 104, i.e. it helps avoid the situation in which regions of allocated memory are interspersed between regions of free memory in such a way that the size of a contiguous region of free memory is too small to be of use. This is due to the allocated regions of memory being of predetermined fixed sizes (i.e. one of the associated size values), which makes arranging these allocated memory regions in the memory 104 easier.

Whilst using free-lists helps reduce the amount of processing that the processor 102 needs to perform for dynamic memory allocation and deallocation, the fact that the memory regions identified by the free-lists are not actually deallocated means that the amount of memory marked as being free in the memory 104 is not as large as it would have been if free-lists were not being used.

Furthermore, the development of applications for execution on the computer system 100 often involves integrating many software modules that have been developed by different parties. The various modules will, invariably, have been developed and written in different styles, with different amounts of the memory 104 being allocated for various functions. Additionally, some modules will have used a large amount of static memory allocation compared to other modules, and some modules will use a large amount of dynamic memory allocation compared to other modules.

Additionally, when an application has been developed for one computer platform 100, but is to be ported across to a different platform, the methods and styles of memory allocation used for the application may not be suitable for this different platform (due to factors such as different sizes of memory available on different platforms and different processing power between different platforms).

Thus, integrating the various different modules and re-working an application for a different computing platform can occupy a large amount of a development project lifetime, in terms of analysis of memory usage and allocation, development and testing of the various modules and their integration and optimisation. For example, when the size of the memory 104 is quite small (such as a memory 104 for a mobile telephone or a personal digital assistant), it is important to ensure that the memory allocation required by all of the modules that are run concurrently does not exceed the amount of memory that is provided by the memory 104, as otherwise one or more of the applications being executed by the computer system 100 may fail. These checks can be a very involved task.

SUMMARY OF THE INVENTION

According to an aspect of the invention, there is provided a method according to the appended claims.

According to another aspect of the invention, there is provided an apparatus according to the appended claims.

According to another aspect of the invention, there is provided a computer program according to the appended claims.

According to another aspect of the invention, there is provided a data carrying medium according to the appended claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader scope of the invention as set forth in the appended claims.

Embodiments of the invention make use of free-lists, which have been described above. However, in contrast to the use of free-lists as described above, in embodiments of the invention, the processor 102 of the computer system 100 may adjust the thresholds associated with the free-lists being used, i.e. the thresholds need not be predetermined. This adjustment is based primarily on the current usage of the memory 104 by the one or more processes that are being executed. This will be described in more detail later. The adjustment of the thresholds may also be based on the frequency with which the regions of memory identified in the free-lists have actually been used, or assigned, to one or more processes. Again, this will be described in more detail later.

Furthermore, a threshold may be adjusted so that it is no longer positive. In this case, the corresponding free-list will not store any identifiers. As such, the effective number of free-lists (i.e. the number of free-lists with positive associated thresholds) may be varied.

Figure 1:
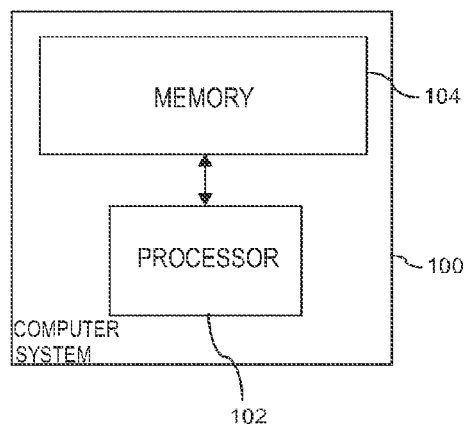
FIG. 1 schematically illustrates a computer system.
Figure 2:
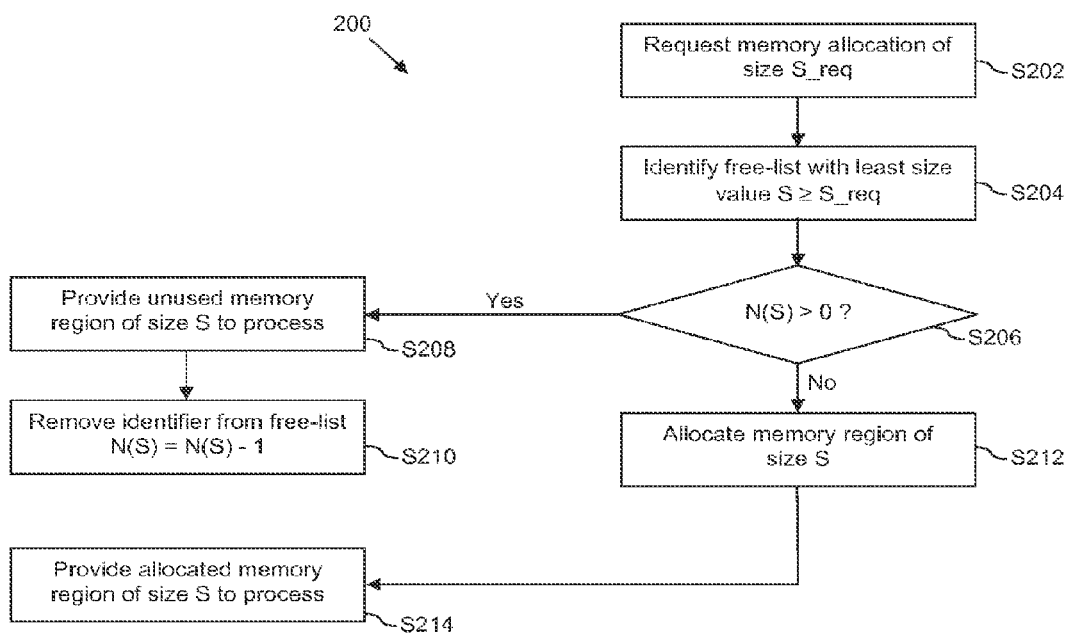
FIG. 2 is a flow-diagram schematically illustrating known processing for dynamic memory allocation using free-lists.
Figure 3:
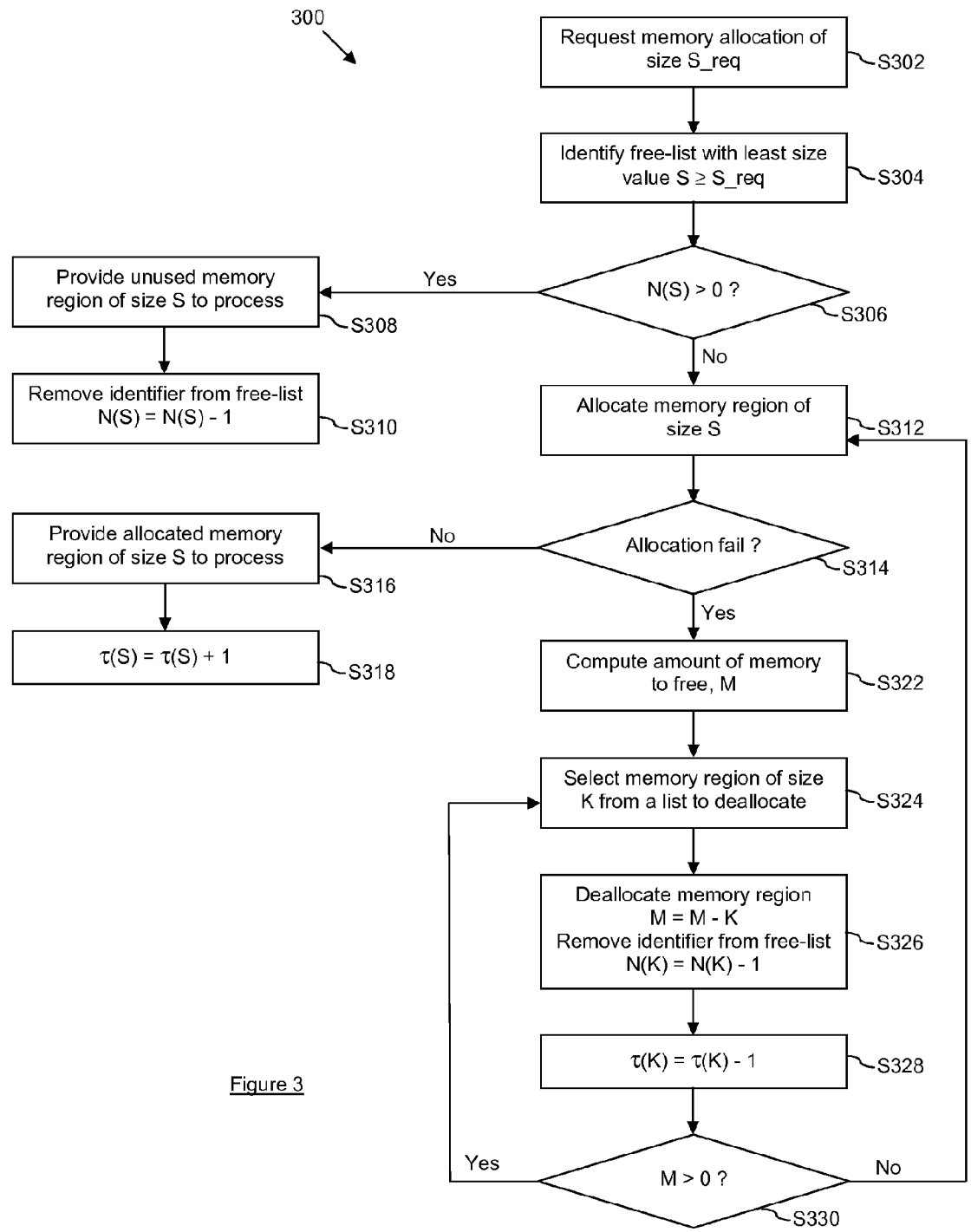
FIG. 3 is a flow-diagram schematically illustrating processing according to an embodiment of the invention for dynamic memory allocation using free-lists.

FIG. 3 is a flow-diagram schematically illustrating processing 300 according to an embodiment of the invention for dynamic memory allocation using free-lists. The processing 300 shown in FIG. 3 is closely related to the known processing 200 shown in FIG. 2, as discussed in more detail below.

At a step S302, a dynamic memory allocation request is called by a process, requesting allocation of a region of the memory 104 of size S_req. This is the same as the step S202 of FIG. 2.

At a step S304, the free-list of size S to use for this dynamic memory allocation request is identified. The processing at the step S304 is the same as the processing at the step S204 of FIG. 2 as described above, and shall not be described in more detail here.

At a step S306, it is determined whether the free-list with the identified associated size value S is empty, i.e. whether that free-list is currently storing any identifiers. If N(S)>0 (i.e. that free-list is not empty as there is at least one identifier stored in this free-list), then processing continues at a step S308; otherwise, if N(S)=0 (i.e. that free-list is empty as there are no identifiers stored in this free-list), then processing continues at a step S312.

At the step S308 (when the identified free-list is not empty), one of the identifiers in the identified free-list is chosen, and the associated memory region is assigned to, and identified to, the process that made the dynamic memory allocation request. This may be performed in the same manner as at the step S208 of FIG. 2.

Then at a step S310, the chosen identifier is removed from the identified free-list and the value of N(S) is decremented by one to update the number of identifiers in the free-list accordingly.

Alternatively, at the step S312 (i.e. when the identified free-list is empty), the processor 102, using the underlying operating system functionality, actually performs an allocation of a memory region of the identified size S. Methods for doing this are discussed above, i.e. a search for a contiguous region of free memory having the identified size S is performed. If the search is successful then the memory region that is found is marked as being allocated.

Then, at a step S314, it is determined whether or not the memory allocation at the step S312 was successful. If the memory allocation was successful (i.e. a region of free memory of the identified size S has been found at the step S312), then processing continues at a step S316. Otherwise, if the memory allocation was unsuccessful (i.e. a region of free memory of the identified size S has not been found at the step S312), then processing continues at a step S322.

When a region of free memory having the identified size S has been found at the step S312, then at the step S316, that memory region is identified (indicated) to the process requesting the dynamic memory allocation, for example by returning a pointer to that memory region in response to the call to the malloc function.

Then, at a step S318, the value of the threshold associated with the free-list having the identified associated size value S is incremented by 1, i.e. $\tau(S)=\tau(S)+1$.

Alternatively, when a region of free memory having the identified size S has not been found at the step S312, then at the step S322, an amount M of the memory 104 to be deallocated, or freed, is calculated. This amount M of the memory 104 is intended to be sufficient so that, once that amount M of currently allocated memory has been deallocated, the step S312 will successfully find a region of the identified size S when it is next executed. Methods for calculating the amount of memory to be freed, M, will be described later.

At a step S324, one of the regions of memory identified in one of the free-lists is selected. Methods for selecting a memory region will be described later. However, we shall assume for now that this memory region is identified in a free-list having associated size value K, i.e. the size of this selected memory region is K. If all of the free-lists are empty, so that no memory region may be selected, then processing returns to the step S312 (not shown in FIG. 3).

At a step S326, the selected memory region is deallocated by the processor 102, using the functionality of the underlying operating system, so that this memory region is now marked as being free for allocation. The value of M is decremented by K (as the memory freed by this deallocation is of size K, and so the amount of memory to be freed should be decremented by K accordingly). The identifier of the deallocated memory region is then removed from its free-list (i.e. the free-list having associated size value K). Consequently, the value of N(K) is decremented by 1.

At a step S328, the value of the threshold associated with that free-list is decremented by 1, i.e. $\tau(K)=\tau(K)-1$.

Then, at a step S330, it is determined whether or not the desired amount of memory to be freed (as calculated at the step S322) has now been deallocated, i.e. whether or not M>0. If the amount of memory to be freed has not been deallocated yet (i.e. M>0), then processing returns to the step S324. Otherwise, if the amount of memory to be freed has now been deallocated (i.e. M≤0), then processing returns to the step S312, at which an attempt to allocate a contiguous region of free memory of the identified size S is made again.

If, at the step S324, it is determined that all of the free-lists are empty, then, as mentioned above, processing will have returned to the step S312 at which the processor 102 attempts to allocate a contiguous region of memory of the identified size S. If this allocation fails again, then it is no longer possible to free more memory by deallocating memory regions identified by the free-lists, as there are no memory regions identified. Hence, the request for the dynamic memory allocation fails, and this is indicated to the process requesting the dynamic memory allocation accordingly, for example by the malloc function returning a NULL pointer.

Figure 4:
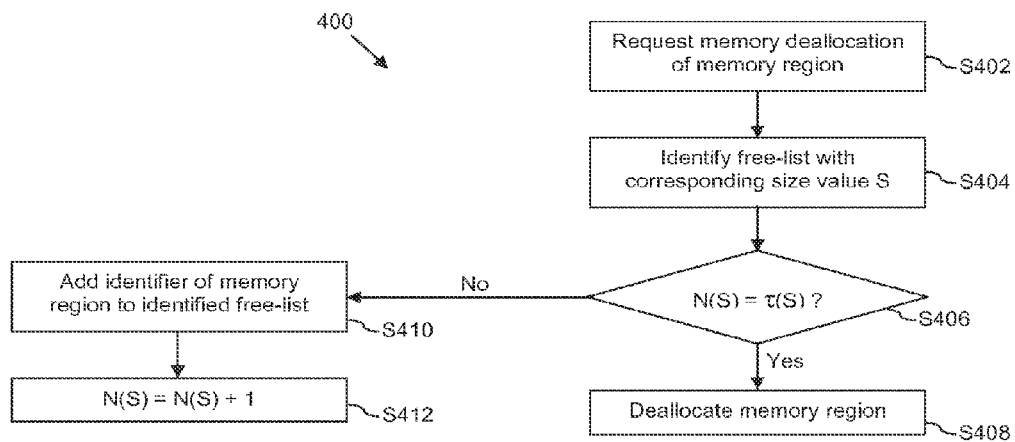
FIG. 4 is a flow-diagram schematically illustrating known processing for dynamic memory deallocation using free-lists.

In the above processing 300 of FIG. 3, the threshold associated with a free-list with associated size value S is increased at the step S318 to reflect the fact that this free-list might not have been large enough to store a sufficient number of identifiers for future requests for dynamic memory allocations using that free-list. For example, a memory region of size S may have been deallocated at the step S408 of FIG. 4, because the free-list with associated size value S already stored the threshold τ(S) number of identifiers. However, the step S318 is subsequently reached because that free-list has now been emptied. That free-list would have been used at the step S308 to provide a memory region to the requesting process if it had been storing an extra identifier. Hence, the threshold τ(S) is increased.

Additionally, when the memory allocation of the step S312 has failed, this is an indicator that the amount of memory that remains free in the memory 104 is becoming limited. As the memory regions identified by the free-lists are not regions of the memory 104 that the processor 102 identifies as being free, then maintaining the present number of memory regions in the free-lists will maintain a potentially unsuitable amount of the memory 104 as being marked as unavailable for use. The regions of the memory 104 identified by the free-lists are not actually in use, but neither have they been marked by the processor 102 as being available for use. Hence, in this situation, the threshold for one or more of the free-lists is decreased at the step S328 to represented that, given the current memory usage by the processes, fewer identifiers should be stored in the free-lists.

In this way, the thresholds associated with the free-lists are adjusted by the processor 102 in dependence upon the current usage of the memory 104 by the one or more processes that are being executed by the computer system 100. When the usage of the memory 104 by the processes involves using more memory regions of one size than another, then the threshold for that more frequently used size is increased. When the usage of the memory 104 by the processes is such that the amount of memory that is free in the memory 104 is becoming low (so that a memory allocation request at the step S312 has failed), then the threshold for one or more of the free-lists is decreased, thereby releasing memory back for use.

Embodiments of the invention may make use of various methods for calculating, at the step S322, the amount of the memory, of size M, to be freed. For example:

1. The value of M could be a percentage of the total amount of memory of all of the memory regions identified by the free-lists, i.e.

$$M = \frac{x}{100} \sum_S S.N(S),$$

where the percentage is x % and the summation is across all of the size values associated with the free-lists. An example value for x is 20%, although this value may be set according to the particular computer system 100 being used, the size of the memory 104, and the expected nature of the processes that will be executed by the processor 102.

2. The value of M could be calculated as in example 1 above, except that the summation is only over size values associated with a subset of the free-lists, such as those size values neighbouring, or close to, the identified size value S.

3. The value of M could be set to the identified size value S, or to some predetermined multiple of the identified size value, such as 2S or 3½S.

4. The value of M could be dependent on the frequency at which the memory allocation at the step S312 fails. For example, the frequency of failure of the memory allocation at the step S312 may be monitored and, if this frequency is above a predetermined threshold, then the value of M could be calculated according to methods 1, 2 or 3 above, but then increased by a predetermined amount and/or in proportion to the amount by which the frequency is above the predetermined threshold.

Embodiments of the invention may make use of various methods for selecting, at the step S324, the particular size value K for use in the subsequent memory deallocation. For example, the value of K may be the smallest size value associated with a free-list which is greater than the identified size S and for which N(K) is greater than 0, i.e. the free-list with associated size value K is not empty. Alternatively, the value of K may be the size value associated with a free-list which is closest to the identified size S and for which N(K) is greater than 0. Alternatively, the value of K may be the smallest size value associated with a free-list which is greater than the value of M and for which N(K) is greater than 0. Alternatively, the value of K may be the size value associated with a free-list which is closest to the value of M and for which N(K) is greater than 0.

Embodiments of the invention may make use of various methods for selecting, at the step S324, from the free-list with associated size value K, the particular identifier for the memory region of size K that is to be subsequently deallocated. For example, the identifier that was most recently added to that free-list may be selected—for this embodiment, the free-list may be implemented as a last-in-first-out buffer. Alternatively, the identifier that has been in the free-list the longest may be selected—for this embodiment, the free-list may be implemented as a first-in-first-out buffer. Alternatively, the identifier may be selected at random from the free-list.

However, an embodiment of the invention, to be described later, selects, at the step S324, the free-list of size K and the identifier in that free-list based on an indication of a frequency with which the regions of the memory 104 identified by the free-lists have been assigned to any of the one or more processes, with the particular region of the memory 104 that has the lowest frequency indication being selected at the step S324. For example, the identifier that has been stored in the free-lists for the longest amount of time may be chosen at the step S324, thereby choosing the particular free-list and the particular region of the memory 104 to be deallocated. This embodiment will be described in more detail later.

Figure 6:
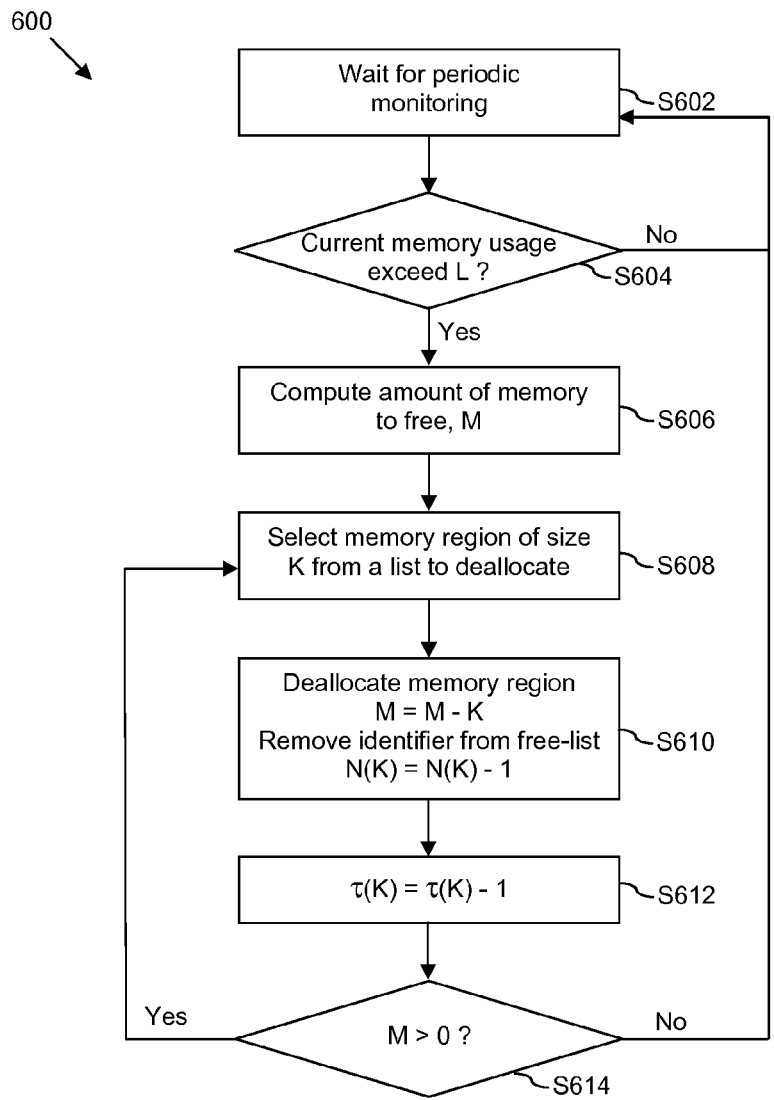
FIG. 6 is a flow-diagram schematically illustrating processing according to an embodiment of the invention for monitoring memory usage.

FIG. 6 is a flow-diagram schematically illustrating processing 600 according to an embodiment of the invention for monitoring memory usage. The monitoring of FIG. 6 is performed periodically (for example every 10 ms) and may be performed by a process that is executed by the processor 102 and that is responsive to a clock of the computer system 100.

At a step S602, the monitoring process waits until it is to perform its periodic monitoring function. When the time comes for the monitoring process to perform its periodic monitoring function, processing continues to a step S604.

At the step S604, a determination is made as to whether the current amount of memory in use F (i.e. the amount of memory which the processor 102 recognises as being allocated) exceeds a threshold level L. The processor 102 may therefore maintain a record of the amount of memory that it allocates to the processes, updating this when memory is allocated or deallocated. The level L could be, for example, a predetermined percentage of the total size T of the memory 104, such as 70% (i.e. L=0.7T). If the amount of memory in use F exceeds this threshold level L, then processing continues at a step S606; otherwise the current monitoring cycle is complete and processing returns to the step S602.

We note that, in an alternative embodiment, the total size T is the total size of the heap, and not the total size of the memory 104. In this case, the value of F is the amount of memory that has been currently dynamically allocated for the processes.

At the step S606, an amount M of the memory 104 to be freed is calculated. This amount M of the memory 104 is intended to be an amount of the memory 104 that will be sufficient to ensure that the amount of the memory 104 that is in use does not become too much, which could then make memory allocations at the step S312 of FIG. 3 more difficult, more time consuming and more likely to fail. The value of M may be calculated in a variety of ways. For example, the value of M may be calculated as the amount by which the current memory usage exceeds the threshold L, i.e. M=F−L. With this embodiment, the monitoring process attempts to reduce the amount of memory in use down to the threshold level L. Alternatively, it may be desirable to reduce the amount of memory in use further, so that, for example, the value of M may calculated as the amount by which the current memory usage exceeds the threshold L, plus an additional amount A, i.e. M=F−L+A, or the value of M may calculated as a multiple B (where B of the amount by which the current memory usage exceeds the threshold L, i.e. M=B(F−L), or as a combination of these two.

Then, at a step S608, one of the regions of memory identified in one of the free-lists is selected. Methods for selecting a memory region will be described later. However, we shall assume for now that this memory region is identified in a free-list having associated size value K, i.e. the size of this selected memory region is K. If all of the free-lists are empty, so that no memory region may be selected, then the current monitoring cycle is complete and processing returns to the step S602 (not shown in FIG. 6).

At a step S610, the selected memory region is deallocated by the processor 102, using the functionality of the underlying operating system, so that this memory region is now marked as being free for allocation. The value of M is decremented by K (as the memory freed by this deallocation is of size K, and so the amount of memory to be freed should be decremented by K accordingly). The identifier of the deallocated memory region is then removed from its free-list (i.e. the free-list having associated size value K). Consequently, the value of N(K) is decremented by 1.

At a step S612, the value of the threshold associated with that free-list is decremented by 1, i.e. τ(K)=τ(K)−1.

Then, at a step S614, it is determined whether or not the desired amount of memory to be freed (as calculated at the step S606) has now been deallocated, i.e. whether or not M>0. If the amount of memory to be freed has not been deallocated yet (i.e. M>0), then processing returns to the step S608. Otherwise, if the amount of memory to be freed has now been deallocated, then the current monitoring cycle is complete and processing returns to the step S602.

In this way, the thresholds associated with the free-lists are adjusted by the processor 102 in dependence upon the current usage of the memory 104 by the one or more processes that are being executed by the computer system 100. When the usage of the memory 104 by the processes involves using above a certain level of the total memory available from the memory 104, then the threshold for one or more of the free-lists is decreased, thereby releasing memory back for use.

Embodiments of the invention may make use of various methods for selecting, at the step S608, the size K for use in the subsequent memory deallocation. For example, the value of K may be the least size value associated with a free-list which is greater than the value of M and for which N(K) is greater than 0. Alternatively, the value of K may be the size value associated with a free-list which is closest to the value of M and for which N(K) is greater than 0.

Embodiments of the invention may make use of various methods for selecting, at the step S608, from the free-list with associated size value K, the particular identifier for the memory region of size K that is to be subsequently deallocated. For example, the identifier that had been most recently added to that free-list may be selected—for this embodiment, the free-list may be implemented as a last-in-first-out buffer. Alternatively, the identifier that has been in the free-list the longest may be selected—for this embodiment, the free-list may be implemented as a first-in-first-out buffer. Alternatively, the identifier may be selected at random from the free-list.

However, an embodiment of the invention, to be described later, selects, at the step S608, the free-list of size K and the identifier in that free-list based on an indication of a frequency with which the regions of the memory 104 identified by the free-lists have been assigned to any of the one or more processes, with the particular region of the memory 104 that has the lowest frequency indication being selected at the step S608. For example, the identifier of the memory region that has been stored in the free-lists for the longest amount of time may be chosen at the step S608 (thereby choosing the particular free-list and the region of memory to be deallocated). This will be described in more detail later.

When the monitoring process 600 described above with reference to FIG. 6 is used, some embodiments of the invention may keep the step S328 of FIG. 3, so that the thresholds for the free-lists may be decremented at both the step S328 and the step S612. Alternatively, when the monitoring process 600 described above with reference to FIG. 6 is used, some embodiments of the invention may not perform the step S328 of FIG. 3, so that the thresholds for the free-lists may be decremented at the step S612, but no longer at the step S328. Some embodiments of the invention do not make use of the monitoring process 600.

Figure 5:
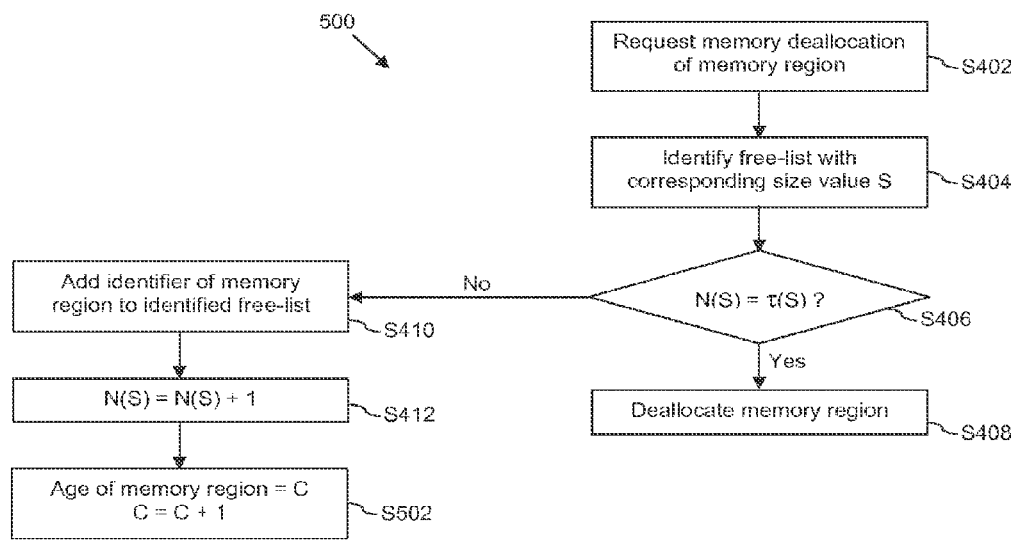
FIG. 5 is a flow-diagram schematically illustrating processing according to an embodiment of the invention for dynamic memory deallocation using free-lists.

FIG. 5 is a flow-diagram schematically illustrating processing 500 according to an embodiment of the invention for dynamic memory deallocation using free-lists. The processing 500 shown in FIG. 5 is the same as the processing 400 shown in FIG. 4, except for the addition of a step S502. Thus, the processing 500 of FIG. 5 involves the steps S402-S412 of the processing 400 of FIG. 4, as described above, and which shall, therefore, not be described again here.

For the dynamic memory deallocation processing 500 performed for the embodiment illustrated in FIG. 5, a counter C is maintained. This counter is intended to represent an "age" value for the memory regions identified in the free lists being used. For each identifier stored in one of the free-lists, an associated frequency indicator (or age value or order indicator) is stored and maintained, i.e. each of the memory regions identified by the free-lists has an associated frequency indicator (or age value or order indicator). The frequency indicator associated with a memory region may be stored, for example, in a data structure specifically designed for that purpose. Alternatively, if the memory management provides a header and/or a footer for the dynamically allocated memory region, then the frequency indicator for a memory region may be stored in the header and/or the footer for that memory region.

Thus, at the step S502 (which is reached when an identifier to a memory region is added to a free-list in response to a process requesting dynamic memory deallocation of that memory region), the frequency indicator associated with that memory region is set to be the counter value C. The counter value C is then incremented by 1. In this way, the frequency indicator serves as an indication of when the corresponding memory region identifier was added to the respective free-list. In other words, in this embodiment the frequency indicators serve as an indication of the relative order with which the identifiers were added to the free-lists.

In this way, the relative "ages", or frequency of use, of the memory regions identified in the free-lists can be compared, i.e. it is possible to determine whether an identifier has been stored in one of the free-lists longer than another identifier. For example, a first identifier in a free-list having an associated size value $S_1$ may have an associated frequency indicator (or age) of 14, whilst a second identifier in a free-list having an associated size value of $S_2$ may have an associated frequency indicator (or age) of 26. As this second frequency indicator is larger than the first frequency indicator, the first identifier has been stored in its free-list longer than the second identifier has been stored in its free-list, i.e. the first identifier was added to its free-list before the second identifier was added to its free-list. Note that here, $S_1$ may be the same as, or different from, $S_2$.

When an embodiment of the invention makes use of the processing illustrated in FIG. 5, then the processing at the step S324 of FIG. 3 and/or the step S608 of FIG. 6 may be carried out by selecting the memory region identified by the free-lists that has the smallest associated frequency indicator. This indicates that the selected memory region is the memory region that has not been required by the processor 102 for the longest period of time and hence is not a commonly used memory region. The selected memory region is therefore the one identified by the identifier which, out of the currently stored identifiers, was added to the free-lists earliest, i.e. the longest time ago. Thus, as the processor 102 needs to deallocate an amount of memory, this memory region, being the most unused one, is a suitable choice for deallocation.

Additionally, when an embodiment of the invention makes use of the processing illustrated in FIG. 5, then the processing at the step S308 FIG. 3 may chose the memory region identified by the free-list with the identified size value S that has the largest associated frequency indicator, i.e. the identifier that was most recently added to that free-list is selected.

It will be appreciated that other embodiments of the invention may make use of other methods of generating and using frequency indicators. For example, the counter C may not be incremented at the step S502 every time the step S502 is performed. Instead, the counter C may be incremented at the step S502 only every successive G-th performance of the step S502, where G is a predetermined value. Indeed, the scenario in which the counter C is incremented every time the step S502 is performed is an example in which G=1. However, other positive integer values of G may be used, such as G=2 or G=3. In this way, groups of identifiers of up to size G are formed, with the identifiers in a group having the same associated frequency indicator. Then, at the step S324 of FIG. 3 and/or the step S608 of FIG. 6, the processor 102 may deallocate some or all of the memory regions identified by identifiers in the group having the smallest associated frequency indicator.

It will be appreciated that, at the step S502, the counter could be decremented instead of being incremented. In this case, the identifier that has the smallest associated frequency indicator is the identifier that was most recently added to the free-lists, and the identifier that has the largest associated frequency indicator is the identifier that was added to the free-lists the longest time ago.

Alternatively, rather than using a counter C at the step S502, the processor 102 may execute a monitoring process that maintains, for each memory region that has been dynamically allocated, a frequency indicator that represents the frequency with which an identifier for that memory region has been added to and/or removed from the free-lists. However, the above-described embodiment that makes use of the counter C had advantages over this particular alternative approach, as this alternative approach involves actively executing a background monitoring process, which inherently consumes some of the memory 104 and processing cycles of the processor 102.

It will be appreciated that, in other embodiments of the invention, the threshold value $\tau(S)$ may be incremented at the step S318 by a positive integer greater than 1. It will also be appreciated that, in other embodiments of the invention, the threshold value τ(K) may be decremented at the step S328 or at the step S612 by a positive integer greater than 1.

It will be appreciated that the methods for calculating the value of M at the step S322 and at the step S606 given above are purely exemplary, and other methods may be used accordingly.

Furthermore, in an alternative embodiment of the invention, the processing 300 of FIG. 3 may be changed so that (i) the steps S322 and S330 are omitted (ii) the step S326 does not to decrease the value of M and (iii) after the processing of the step S328 has completed, processing is returned to the step S312. In this way, the desired amount M of memory to be freed is not calculated or used. As such, at the step S324, one or more of the memory regions identified by the free-lists may be chosen. For example, a memory region of the largest size may be chosen. Alternatively, a memory region with a lowest associated frequency indicator may be chosen.

Similarly, in an alternative embodiment of the invention, the processing 600 of FIG. 6 may be changed so that (i) the steps S606 and S614 are omitted (ii) the step S610 does not to decrease the value of M and (iii) after the processing of the step S612 has completed, processing is returned to the step S602. In this way, the desired amount M of memory to be freed is not calculated or used. As such, at the step S608, one or more of the memory regions identified by the free-lists may be chosen. For example, a memory region of the largest size may be chosen. Alternatively, a memory region with a lowest associated frequency indicator may be chosen.

Additionally, in some embodiments of the invention, the processing at the step S312 of FIG. 3 is performed such that, if the allocation of the memory region of size S by the processor 102 and the underlying operating system takes longer than a threshold amount of time (or processing cycles), then the memory allocation is deemed to have failed (i.e. is unsuccessful) and, rather than continue to try to find and allocate that memory region of size S, processing continues to the step S314 and then to the step S322. Thus, the step S312 may involve monitoring the amount of time (or processing cycles) that is being used to allocate the memory region and determining whether this amount of time exceeds a threshold time. This has particular advantages of avoiding abnormal/unnecessary usage of processing time by the processor 102 in trying to find a region of the memory 104 of a particular size when one might not actually exist. This is especially useful when the memory 104 has lots of external fragmentation (discussed above), as when external fragmentation is high, it can take a long time for the processor 102 to locate a contiguous memory region of the requested size.

Embodiments of the invention thus provide for flexible adjustment/alteration of the thresholds associated with the free-lists that are being used. The use of free-lists reduces the amount of processing cycles that the processor 102 uses when performing dynamic memory allocation and deallocation. The adjustments made to the thresholds helps to ensure that an appropriate amount of the memory 104 remains free for allocation to the various processes being executed. The prior art usage of free-lists does not provide for adapting the thresholds for the free-lists in response to current memory usage. However, embodiments of the invention, by being able to adjust the thresholds associated with the free-lists, can increase the thresholds when the requests for memory allocations are not being served adequately by the free-lists, but can also decrease the thresholds when the amount of free memory in the memory 104 is becoming potentially too small.

This provides a good trade-off between memory usage and processing time when performing dynamic memory allocation and deallocation. In turn, this helps developers to port program code between platforms and to integrate different program modules with reduced time, analysis and cost.

Furthermore, as a threshold may become 0-valued (i.e. the corresponding free-list becomes empty), the particular free-lists that are in use can be adapted to the current memory requirements of, and usage by, the processes being executed. For example, if a wide range of sizes of memory regions are being requested by the processes, then the thresholds associated with the free-lists may be approximately the same. However, if only a small range of sizes of memory regions are being requested by the processes, then the thresholds associated with the free-lists suitable for those requested sizes can be increased, with the other thresholds being decreased accordingly. This helps to dynamically use the free-lists to their greatest effect.

Additionally, the number of free-lists may be increased compared to those of the known systems, with a number of them potentially initially having associated threshold values of 0. More flexibility and resolution may therefore be provided by the free-lists when such threshold adaptation is performed. This has the further advantage of helping to reduce the amount of internal fragmentation of the memory 104. Internal fragmentation occurs when a memory allocation request is for an amount, $S\_req$, of memory, but a region of memory of a larger size, S, is actually allocated. For example, 433 bytes may be requested for allocation to a process, but a memory region of size 1000 bytes may be provided to the process, leaving 567 bytes that are allocated, but which will not be being used. By allowing the thresholds to become 0-valued, and thereby allowing more free-lists to be actually implemented and used, a more appropriate memory region size may be used. In the above example, with an embodiment of the invention that has more free-lists available, a memory region of size 600 bytes may be provided to the process, thus only now leaving 167 bytes that are allocated, but which will not be being used (i.e. reduced internal fragmentation).

The invention may also be implemented in a computer program for running on a computer system, at least including code portions for performing steps of a method according to the invention when run on a computer system or enabling a computer system to perform functions of a device or system according to the invention.

A computer program is a list of instructions such as a particular application program and/or an operating system. The term "computer program", as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

A computer program is typically stored internally on computer readable storage medium or transmitted to the computer system via a computer readable transmission medium. Such computer readable media may be permanently, removably or remotely coupled to an information processing system. The computer readable media may include, for example and without limitation, any number of the following: magnetic storage media including disk and tape storage media, optical storage media such as compact disk media (e.g., CD-ROM, CD-R, etc.) and digital video disk storage media; nonvolatile memory storage media including semiconductor-based memory units such as FLASH memory, EEPROM, EPROM, ROM, ferromagnetic digital memories; MRAM, volatile storage media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of managing a memory of an apparatus, the apparatus executing one or more processes using the memory, the method comprising:
   (a) maintaining a plurality of lists of identifiers, wherein each list has an associated size value and an associated threshold corresponding to a maximum number of identifiers in that list, wherein each identifier identifies a corresponding region of the memory that had been allocated for a process but that is currently not required by any of the one or more processes, and wherein a size of a region of the memory identified by an identifier in a list equals the size value associated with that list;
   (b) when a process requests allocation of a region of the memory:
      selecting one of the lists that has an associated size value suitable for the allocation request; and
      if the selected list is not empty, indicating to that process a region of the memory identified by one of the identifiers in the selected list and removing that identifier from the selected list, and, otherwise, allocating a region of the memory with a size of the size value associated with the selected list and indicating the allocated region of the memory to that process; and
   (c) adjusting one or more of the thresholds in dependence upon the current usage of the memory by the one or more processes.

2. A method according to claim 1, comprising:
   (d) when a process indicates that a region of the memory that has been allocated for that process is no longer required by that process:
      identifying one of the lists that has an associated size value equal to the size of that region of the memory; and
      if the number of identifiers in that list is less than the threshold associated with that list, adding an identifier to that list to identify that region of the memory, and, otherwise, deallocating that region of the memory.

3. A method according to claim 2, in which step (c) comprises:
   if the step of allocating in step (b) is successful, then incrementing the threshold associated with the selected list.

4. A method according to claim 2, in which step (c) comprises:
   if the step of allocating in step (b) is unsuccessful, then:
      (e) deallocating a region of the memory identified by one of the identifiers in one of the lists;
      (f) removing that identifier from that list; and
      (g) decrementing the threshold associated with that list.

5. A method according to claim 2, in which step (c) comprises:
   periodically determining whether the amount of the memory being used by the one or more processes exceeds a predetermined threshold; and
   if it is determined that the amount of the memory being used by the one or more processes exceeds the predetermined threshold, then:
      (h) deallocating a region of the memory identified by one of the identifiers in one of the lists;
      (i) removing that identifier from that list; and
      (j) decrementing the threshold associated with that list.

6. A method according to claim 1, in which step (c) comprises:
   if the step of allocating in step (b) is successful, then incrementing the threshold associated with the selected list.

7. A method according to claim 6, in which the step of allocating in step (b) is unsuccessful if the time to allocate the region of the memory exceeds a threshold time.

8. A method according to claim 6, in which the step of allocating in step (b) is unsuccessful if an unallocated region of the memory with a size of the size value associated with the selected list cannot be found.

9. A method according to claim 6, in which step (c) comprises:
   if the step of allocating in step (b) is unsuccessful, then:
      (e) deallocating a region of the memory identified by one of the identifiers in one of the lists;
      (f) removing that identifier from that list; and
      (g) decrementing the threshold associated with that list.

10. A method according to claim 1, in which step (c) comprises:
    if the step of allocating in step (b) is unsuccessful, then:
       (e) deallocating a region of the memory identified by one of the identifiers in one of the lists;
       (f) removing that identifier from that list; and
       (g) decrementing the threshold associated with that list.

11. A method according to claim 10, comprising:
determining an amount of the memory to deallocate; and
repeating steps (e), (f) and (g) until the amount of the memory that is deallocated at step (e) is at least the determined amount of the memory.

12. A method according to claim 10, in which the step of allocating in step (b) is unsuccessful if the time to allocate the region of the memory exceeds a threshold time.

13. A method according to claim 1, in which step (c) comprises:
periodically determining whether the amount of the memory being used by the one or more processes exceeds a predetermined threshold; and
if it is determined that the amount of the memory being used by the one or more processes exceeds the predetermined threshold, then:
(h) deallocating a region of the memory identified by one of the identifiers in one of the lists;
(i) removing that identifier from that list; and
(j) decrementing the threshold associated with that list.

14. A method according to claim 13, comprising:
determining an amount of the memory to deallocate; and
repeating steps (h), (i) and (j) until the amount of the memory that is deallocated at step (h) is at least the determined amount of the memory.

15. A method of managing a memory of an apparatus, the apparatus executing one or more processes using the memory, the method comprising:
(a) maintaining a plurality of lists of identifiers, wherein each list has an associated size value and an associated threshold corresponding to a maximum number of identifiers in that list, wherein each identifier identifies a corresponding region of the memory that had been allocated for a process but that is currently not required by any of the one or more processes, and wherein a size of a region of the memory identified by an identifier in a list equals the size value associated with that list;
(b) when a process requests allocation of a region of the memory:
selecting one of the lists that has an associated size value suitable for the allocation request; and
if the selected list is not empty, indicating to that process a region of the memory identified by one of the identifiers in the selected list and removing that identifier from the selected list, and, otherwise, allocating a region of the memory with a size of the size value associated with the selected list and indicating the allocated region of the memory to that process;
(c) adjusting one or more of the thresholds in dependence upon the current usage of memory by the one or more processes; and
(d) maintaining an order indication that indicates the relative order with which the identifiers in the lists were added to the lists.

16. A method according to claim 15, comprising:
maintaining a counter; and
when, during step (d), an identifier is added to a list:
setting an indicator corresponding to that identifier to the value of the counter; and
incrementing or decrementing the counter.

17. A method according to claim 16, wherein counter is incremented or decremented each time a predetermined number of identifiers have been added to the lists.

18. A method according to claim 15, wherein step (e) comprises selecting an identifier which the order indication indicates as having been added to the corresponding list before the other identifiers were added to the lists, wherein the region of the memory deallocated at step (e) is the region of the memory identified by the selected identifier.

19. A method according to claim 15, when wherein step (h) comprises selecting an identifier which the order indication indicates as having been added to the corresponding list before the other identifiers were added to the lists, wherein the region of the memory deallocated at step (h) is the region of the memory identified by the selected identifier.

20. A method of managing a memory of an apparatus, the apparatus executing one or more processes using the memory, the method comprising:
maintaining a plurality of free-lists, each free-list having an associated threshold corresponding to a maximum number of regions of the memory identified by that free-list;
when a process requests allocation of a region of the memory:
selecting one of the lists that has an associated size value suitable for the allocation request; and
if the selected list is not empty, indicating to the process a region of the memory identified in the selected list and removing that an identifier for that region of the memory from the selected list; and
adjusting one or more of the thresholds in dependence upon the current usage of the memory by the one or more processes.

* * * * *